Sept. 14, 1943.　　　A. BOYNTON　　　2,329,182
LATCH
Filed April 10, 1939　　　4 Sheets-Sheet 1

ALEXANDER BOYNTON, INVENTOR.
BY Jesse R. Stone
&
Lester B. Clark
ATTORNEYS

Sept. 14, 1943.    A. BOYNTON    2,329,182
LATCH
Filed April 10, 1939    4 Sheets-Sheet 2

ALEXANDER BOYNTON, INVENTOR,

BY Jesse R. Stone
Lester D. Clark
ATTORNEYS

Sept. 14, 1943. A. BOYNTON 2,329,182
LATCH
Filed April 10, 1939 4 Sheets-Sheet 3
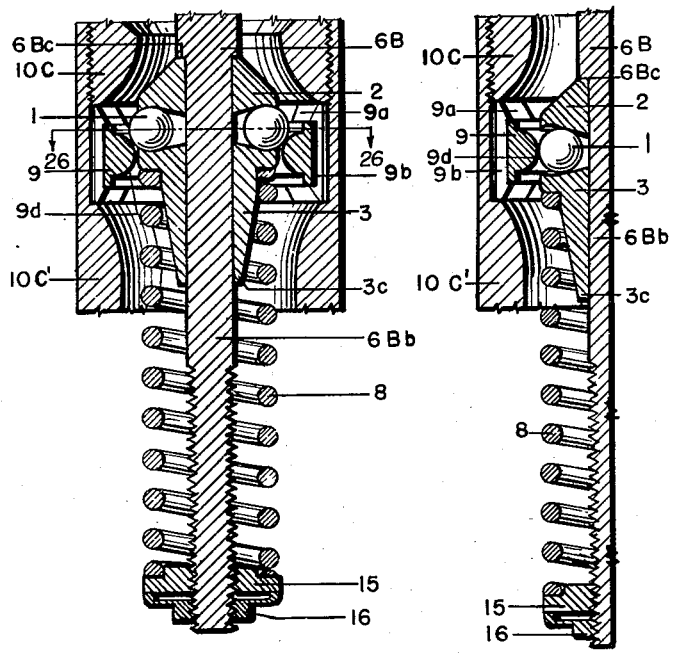
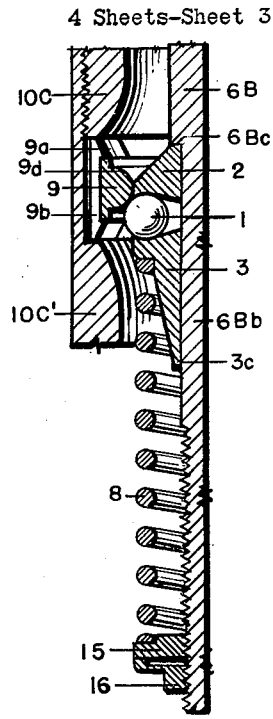
Fig. 23. Fig. 24. Fig. 25.
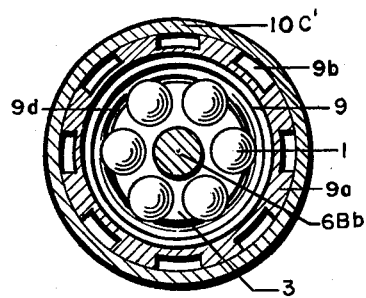
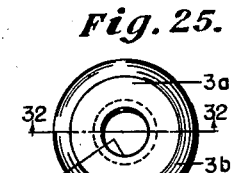
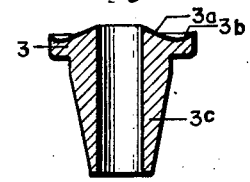
Fig. 26. Fig. 29. Fig. 31.
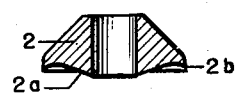
Fig. 30.
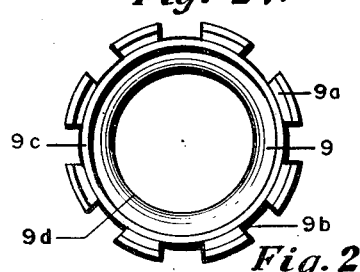
Fig. 27.
Fig. 32.
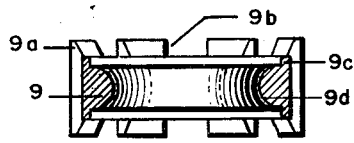
Fig. 28.
ALEXANDER BOYNTON, INVENTOR,
BY Jesse R. Stone
Lester B. Clark
ATTORNEYS Sept. 14, 1943.     A. BOYNTON     2,329,182
LATCH
Filed April 10, 1939     4 Sheets-Sheet 4

ALEXANDER BOYNTON, INVENTOR,
BY Jesse R. Stone
Leslie B. Clark
ATTORNEYS

Patented Sept. 14, 1943

2,329,182

UNITED STATES PATENT OFFICE 2,329,182

LATCH

Alexander Boynton, San Antonio, Tex.

Application April 10, 1939, Serial No. 267,193

20 Claims. (Cl. 74—527)

My invention relates to latches by which the relatively delayed movement of a shaft, valve, or other member is translated into quick action by means of energy stored in a spring as it is compressed and suddenly released.

An object of this invention is to facilitate the quick opening and closing of valves used to control the accumulation and discharge of air or gas under pressure.

A further object of this invention is to provide means whereby valves, shafts, or other mechanical parts may be made to resist movement to a predetermined degree, and then be made to move quickly by the sudden release of stored force.

In carrying out this invention a coiled spring urges balls or rollers against arcuate surfaces which resist the movement of a shaft, first in one direction and then in the opposite direction.

In one form of the invention arcuate surfaces upon the end of a pronged sleeve surrounding the latch shaft engage upon the latch balls to urge them inward against opposed arcuate surfaces upon the shaft.

In another form of the invention the arcuate surfaces upon the latch shaft are replaced by a sleeve having arcuate surfaces, the sleeve being slidable upon the shaft in order to shorten the latch stroke.

In another form of the invention rollers are substituted for balls.

In another form of the invention opposed arcuate surfaces, upon two members surrounding the shaft, urge the latch balls outward against a ring.

In another form of the invention the latch assembly is housed and lubricated.

Means for adjusting the latch is provided in each of the constructions embodying the invention.

The invention, which may take many more forms than are shown to accomplish the same results, consists in the particular construction, means of mounting, and assembly shown, by way of illustration in the accompanying drawings in which:

Fig. 23 is a longitudinal section of a modified form of latch assembly showing the latch at one end of its travel.

Fig. 24 is a longitudinal section of a portion of the assembly shown in Fig. 23, showing the latch midway of its stroke.

Fig. 25 is a longitudinal section of a part of the assembly shown in Fig. 23, showing the latch at completion of its stroke.

Fig. 26 is a horizontal section on the line 26—26, Fig. 23.

Fig. 27 is a vertical section of the sleeve ring shown in Figs. 23 to 26.

Fig. 28 is an end view of the part shown in Fig. 27.

Fig. 29 is a bottom end view of the ball roof of Figs. 23, 24, and 25.

Fig. 30 is a vertical section of the ball roof shown in Fig. 29.

Fig. 31 is an upper end view of the ball floor shown in Fig. 32.

Fig. 32 is a vertical section of the ball floor, Fig. 31.

Corresponding characters are employed throughout the drawings to indicate and refer to corresponding parts.

Similar but somewhat different parts in figures illustrating modifications of the invention are designated by adding capital A in the first modification, capital B in the second modification, capital C in the third modification, and so on, to the number used to designate the similar part in the preferred form. Different portions of the same part are referred to by adding a, b, c, and so on (small letters) to the number employed to designate the part as a whole. Minor and duplicated portions of any part are designated by priming the last letter of reference for the first duplication, double priming the last letter of reference for the second duplication, and so on.

Figure 1:
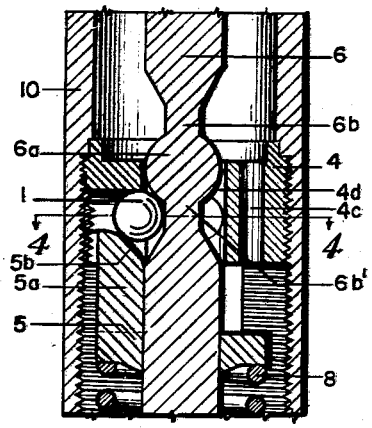
Fig. 1 is a longitudinal section of a portion of a latch assembly showing the latch at one end of its stroke.
Figure 16:
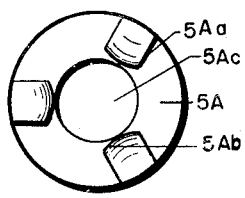
Fig. 16 is a top end view of the roller rider shown in Figs. 12 and 17.

Fig. 1 shows an assembly of a latch, some parts being incomplete, but enough of all parts being shown to illustrate how the device is constructed and how it works. The case 10 may be of any desired length and may be anchored at either end or by attached flange as shown at 10A'a, Fig. 33, and at 11a, Fig. 35, or by any other means. Interiorly of the case a ball cage 4 may be secured by threads or otherwise. A central longitudinal opening 4d through the cage has a sliding fit over latch shaft 6. This shaft has an arcuate portion 6a formed by the reduced sections 6b and 6b' on either side thereof. Latch balls 1 are free to roll in ball path ports 4a, but the inner termini 4a' of these ports are of restricted diameter that the latch balls may not roll through into the central longitudinal opening 4d provided for shaft 6 during assembly or during times when the shaft may be withdrawn for adjustments or replacements. Here it should be stated that three balls and three pronged ball riders are preferred to a greater number because if the ball path ports 4a be not drilled at exactly the same level the three point bearing afforded by the three balls and the three fingers will allow the ball rider to rock slightly out of alignment with shaft 6 and thereby cause each of the prongs of ball rider 5 to rest with equal force upon each of the three latch balls. To allow such rocking of the ball rider the central longitudinal passage through the rider, similar to the passage 5Ac in Fig. 16, should be of somewhat larger diameter than shaft 6 which works through it, and the width of prongs 5a should be appreciably less than the width of slots 4b in which they stand.

In assembling, the balls 1 are placed within ports 4a and cage 4 is screwed in place, as shown in Fig. 1, or otherwise secured over shaft 6. Ball rider 5 with prongs 5a made to register with slots 4b is then so placed that the curved ends 5b of the prongs 5a will rest on the latch balls. Spring 8 is then installed under some compression to urge the ball rider upon the balls which are thereby urged against the arcuate portion 6a of the latch shaft.

Figure 2:
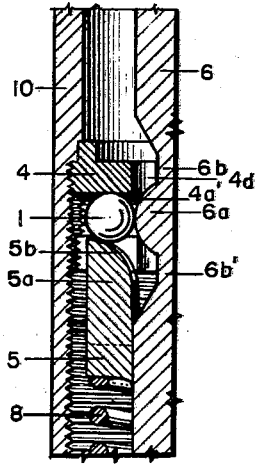
Fig. 2 is a partial longitudinal section of a portion of the latch parts shown in Fig. 1, showing the latch midway of its stroke.
Figure 3:
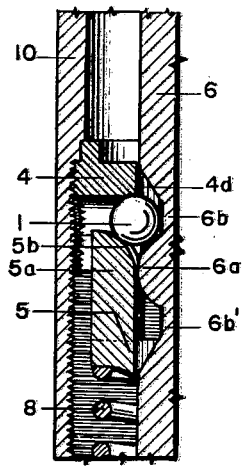
Fig. 3 is a partial longitudinal section of the parts shown in Fig. 2, showing the latch at completion of its stroke.

In operation if the shaft 6 be urged downward with sufficient force latch balls 1 will be forced outward by the arcuate portion 6a. If spring 8 is acting with proper force the latch will release and assume the position shown in Fig. 3, the intermediate position being shown in Fig. 2. By limiting the travel of shaft 6 in either direction it is apparent that the inward travel of the latch balls may be limited and thereby limit the force with which the latch will hold in either direction. Furthermore, increasing the compression force of spring 8 upon the ball rider 5 will increase the force required to operate the latch, and vice versa.

Figure 33:
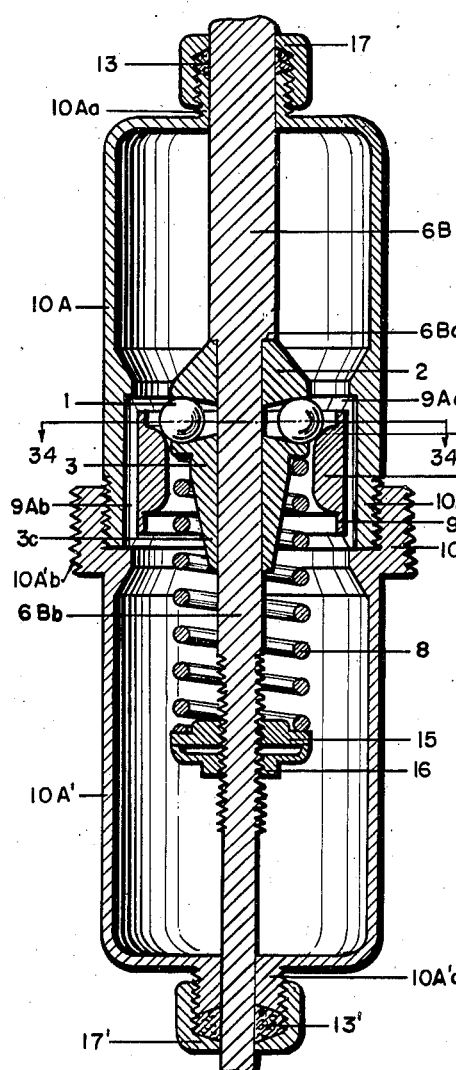
Fig. 33 is a longitudinal section of a further modified form of latch including a lubrication chamber housing and showing the latch at one end of its stroke.
Figure 34:
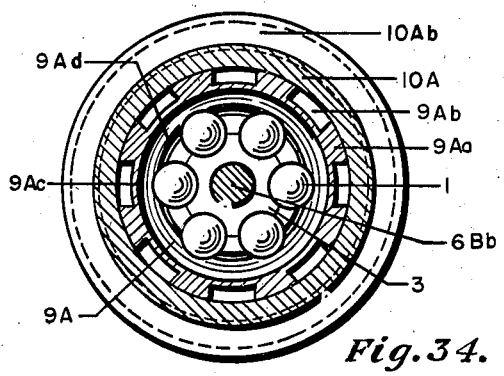
Fig. 34 is a horizontal section on the line 34—34, Fig. 33.
Figure 35:
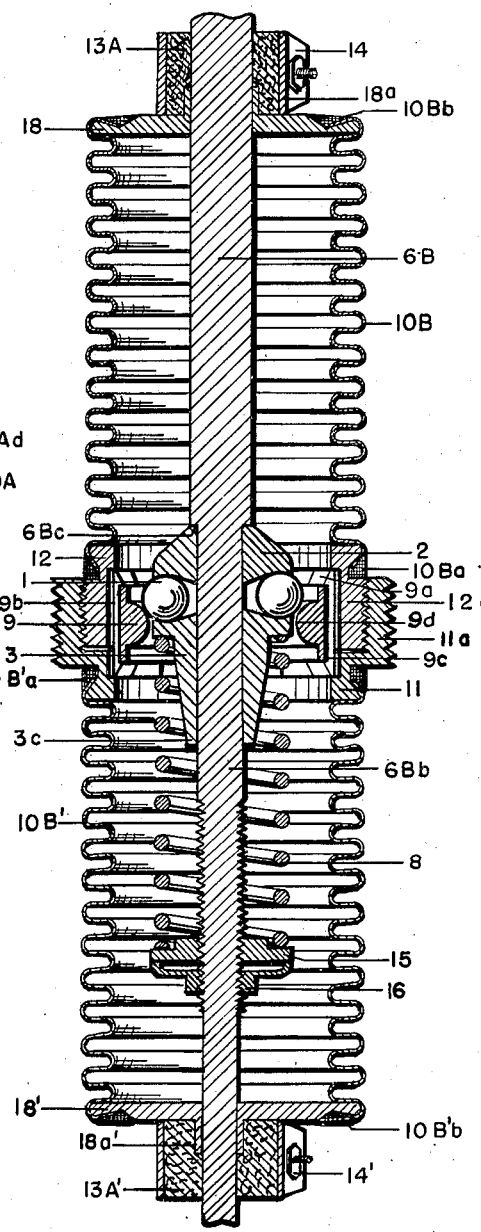
Fig. 35 is a longitudinal section of the latch shown in Fig. 23, showing the same housed within a bellows for lubrication.

Passages 4c are provided that a lubricant which may be confined within the latch assembly in some such manner as shown for modified form of latch in Figs. 33 and 35 will have passageway through ball cage 4 as the latch works.

It will be noted that somewhat less than one-half of each of the latch balls can enter the central passage 4d through cage 4 due to the end section of reduced diameter 4a' of ports 4a, and that in the reverse direction the latch balls are urged inward with decreasing force as they move outward due to the arcuate portion 5b of the ends of prongs 5a. These arcuate surfaces recede from the perpendicular and approach the horizontal in contacting the balls as the balls move outward. It is therefore apparent that the further the balls move inward the greater force must be exerted by the latch shaft to move them outward again because the contact point with each ball approaches the horizontal on the arcuate surface 6a while at the same time the contact point with each ball approaches the perpendicular on the arcuate surface 5b as the balls move inward, each approach becoming progressively more rapid as the inward movement progresses, and vice versa as the balls move outward. It is further apparent that the shape of the arcuate surface at the ends of prongs 5a has much to do with the latch operation.

Figure 7:
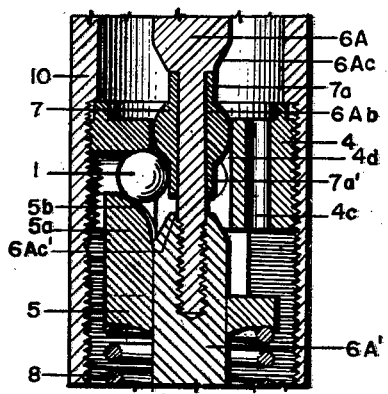
Fig. 7 is a longitudinal section of a modified form of the invention shown in Fig. 1, showing the latch at one end of its stroke.
Figure 8:
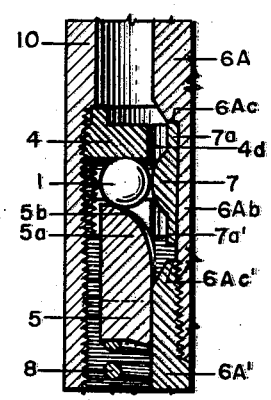
Fig. 8 is a partial longitudinal section of a portion of the latch parts shown in Fig. 7, showing the latch midway of its stroke.
Figure 9:
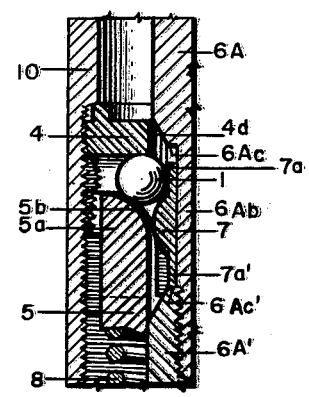
Fig. 9 is a partial longitudinal section of the parts shown in Fig. 8 showing the latch at the completion of its stroke.
Figure 10:
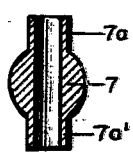
Fig. 10 is a vertical section of the slip ring shown in the assembly of Figs. 7, 8, and 9.
Figure 11:
Fig. 11 is a view of a latch ball comprising an element of the construction.

Fig. 7 shows a latch in all respects similar to the one shown in Fig. 1 except that slip ring 7 has a sliding fit over the portion of reduced diameter 6Ab of shaft 6A. This slip ring may move upward until its upper extension 7a strikes shoulder 6Ac of shaft 6A and it may move downward until its lower extension 7a' strikes shoulder 6Ac' of latch shaft 6A'. The travel of this ring upon the portion of reduced diameter 6Ab of shaft 6A provides that the latch may be adjusted to work with greater snap and force on short strokes than would be possible with the latch shown in Fig. 1 as will appear from the examination of Figs. 7, 8, and 9. In Fig. 7 the latch balls are in their most inward position, and again in their most outward position in Fig. 9, but the shaft travel necessary to cause these two positions is only a part of the travel that would be required except for the slip ring, because immediately after the latch balls reach the position shown in Fig. 8, as the latch shaft continues its downward movement, slip ring 7 will be quickly driven to the position shown in Fig. 9 by the action of the arcuate surfaces of balls 1 and slip ring 7. It is evident that the length of the arcuate surface of member 7 could be reduced and made stationary upon the shaft portion 6A*b* to accomplish a somewhat similar result but the latch action would not be so sensitive and the life of the latch would also be shortened. The comparatively large arcuate surface of slip ring 7 and the snap action of the latch which this ring affords on short latch strokes commends this construction particularly for use in controlling valves in which speed of movement, force of action, and dependability are essential.

Figure 12:
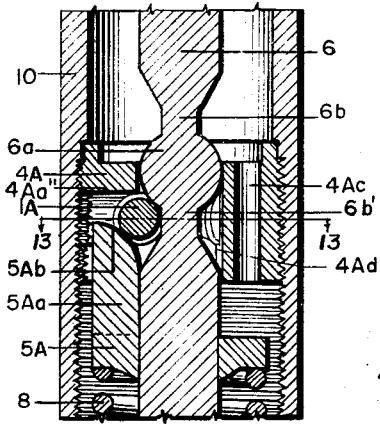
Fig. 12 is a longitudinal section of a portion of a latch assembly showing the latch at one end of its stroke, being used to replace latch balls.
Figure 14:
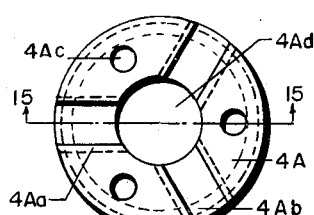
Fig. 14 is a bottom end view of the roller cage shown in Fig. 15.
Figure 15:
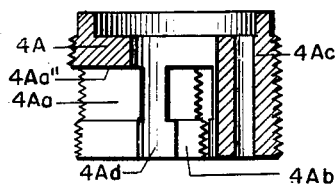
Fig. 15 is a vertical section on the line 15—15, Fig. 14.
Figure 17:
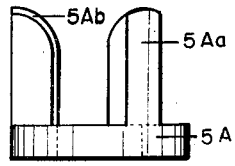
Fig. 17 is a side view of the roller rider shown in Figs. 12 and 16.
Figure 18:
Fig. 18 is a side view of one of the rollers shown in Figs. 12 and 13.

Fig. 12 shows another modified form of latch which employs rollers, shown in Fig. 18, in place of balls as used in Figs. 1 and 7. The roller rider 5A, on its prongs 5A*c*, has arcuate inner surfaces 5A*b* which fit into the depressed surfaces 1A*a* of the rollers 1*a*. The roller paths 4A*a*, of roller cage 4*a*, are rectangular to receive the flat ended rollers 1A which roll inward and outward with the enlarged ends 1A*b* upon the roofs 4A*a*″, of the roller paths 4A*a*, Fig. 15. The prongs 5A*a* are free within solts 4A*b*. Latch shaft 6 has a free sliding fit within central opening 4A*d* of roller cage 4A, through which openings 4A*c* are provided for free circulation of the latch lubricant. The action of the latch is much the same as the ones previously described but the rollers and arcuate portion of the latch shaft will be of longer life in service on account of the line contact between these members instead of the point contact as in Figs. 1 and 7, it being assumed that the radius describing the arc of 1A*a* is the same as the radius describing the arc of the latch shaft portion 6*a*.

Figure 4:
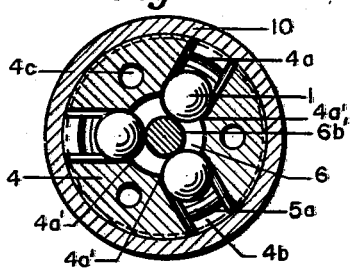
Fig. 4 is a horizontal section on the line 4—4 Fig. 1.
Figure 5:
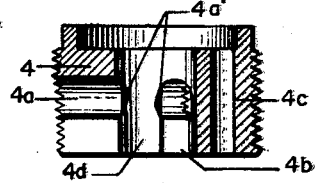
Fig. 5 is a vertical section of the ball cage shown in the assembly of Fig. 1.
Figure 6:
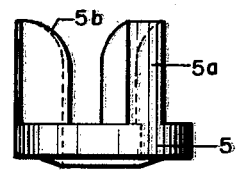
Fig. 6 is a side view of the ball rider shown in Figs. 1, 2, 3, 6, 7, 8, and 9.
Figure 13:
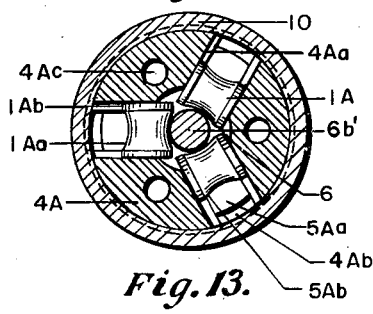
Fig. 13 is a horizontal section on the line 13—13, Fig. 12.
Figure 19:
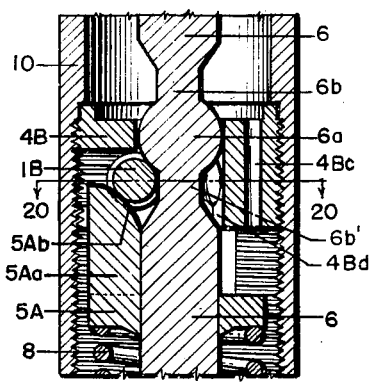
Fig. 19 is a longitudinal section of a portion of the latch assembly showing the latch at one end of its travel using rollers having semispherical ends in the place of balls, Fig. 11, or flat ended rollers, Fig. 18.
Figure 21:
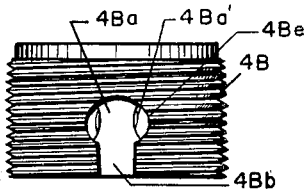
Fig. 21 is an outside view of the roller cage shown in Figs. 19 and 20.
Figure 22:
Fig. 22 is a side view of one of the rollers used in the construction of Figs. 19 and 20.
Figure 20:
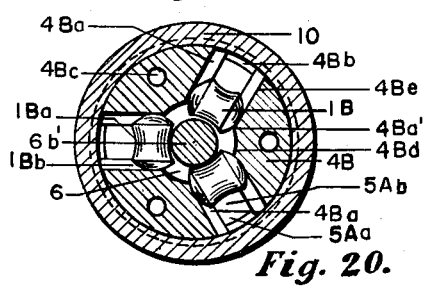
Fig. 20 is a horizontal section on the line 20—20, Fig. 19.

Fig. 19 shows a latch like the one in Fig. 12 except that rollers 1B, detailed in Fig. 22, roll in circular openings 4B*a* of roller cage 4B. The total length of roller 1B is equal to the greatest diameter of the opening 4B*a* less only a working clearance. The ends 1B*b*, therefore, roll and bear upon the surfaces 4B*e*. A pivot like action is, therefore, provided for either end of rollers 1B as they roll in action, thus greatly reducing the friction between rollers 1B and the roof 4B and between the surfaces 5A*b* of the rider and the surfaces 1B*a* of the rollers as the rollers 1B move inward or outward, it being apparent that the rollers must slip on one surface or the other. The pivoting action of surfaces 1B*b* engaging upon the surfaces 4B*e* provides that rollers 1B turn about their axes. Restrictions 4B*a*′ serve the same purpose as restrictions 4*a*′ in Figs. 4 and 5. The central opening 4B*d* allows for a free sliding fit of shaft 6 within it. The slots 4B*b* freely receive the prongs 5A*a* to ride upon rollers 1B as in the similar construction shown in Figs. 12 and 13 in which the rollers 1A are replaced by rollers 1B in Figs. 19 and 20. The circulation ports 4B*c* are for the same purpose as the ports 4A*c* in Fig. 12, as is apparent.

Fig. 23 shows another type of latch in which ball roof 2 is held against shoulder 6B*c* by the expansive force of spring 8 urging ball floor 3 to impinge upon balls 1. The ball roof 2 has an inclined surface 2*a*, Fig. 30, and ball floor has a similar surface 3*a* at the same angle reversely inclined, Fig. 32. These surfaces urge the latch balls outward to contact the arcuate surface 9*d* of sleeve ring 9 integral with base ring 9*c*, detailed in Figs. 27 and 28. Sleeve ring 9 is supported between members 10C and 10C′ as appears in Fig. 23, the slots 9*b* between ribs 9*a* being for circulation of a latch lubricant. The rim 2*b* of the ball roof and 3*b* of the ball floor holds the balls between roof and floor. When the shaft 6B moves downward the balls are forced inward by the inner arcuate surface 9*d* of ring 9. Fig. 24 shows the latch halfway of its travel and Fig. 25 shows the latch movement completed. The ball floor 3 being movable over the shaft portion of reduced diameter 6B*b* extension 3*c* is provided as a guide. Spring 8, always under some compression, has its compression regulated by nut 15 which is locked in place by nut 16, both of said nuts having threaded engagement with the lower end of shaft portion 6B*b* as appears in Fig. 23. This figure shows a means for holding and adjusting spring 8 which means may be used in Figs. 1, 7, 12, and 19. In this construction the arcuate surface upon which the latch balls act is stationary and surrounds the balls which move with the shaft: whereas in the construction shown in Figs. 1, 7, 12, and 19 the latching effect is produced by contacting the inner surfaces of the balls, which do not move with the shaft, upon an arcuate member that moves with the shaft. A further difference between this construction and the construction shown in Figs. 1, 7, 12, and 19 is that more than three balls may, and frequently should be used in the construction shown in Figs. 23 and 33.

Fig. 33 shows a latch similar to the one in Fig. 23. The larger arcuate member 9A, integral with base ring 9A*c*, having at either end arcuate surfaces 9A*d* to engage the latch balls 1, shows that the latch stroke may be increased by providing a straight section between the upper and lower arcuate surfaces as appears. The ribs 9A*a* have firm pressed-in engagement with the case member 10A. Slots 9A*b* provide for free circulation of the latch lubricant. The exterior threads upon member 10A′*a* show means by which the latch housing may be anchored, the latch shaft being free to move through packing 13 and 13′ which is compressed by caps 17 and 17′ respectively engaged upon the threads of extensions 10A*a* and 10A′*a* respectively. Within the latch housing formed by members 10A and 10A′ a lubricant may be placed, and the housing may be anchored by the exterior threads 10A′*b* upon extension 10A′*a* of case section 10A′.

Fig. 35 shows a bellows 10B as soldered to connection 12 at 10B*a* and the plate 18 at 10B*b*, the plate being held around shaft 6B and flange 18*a* by packing 13A gripped by clamp 14. Another bellows 10B′ is soldered to connection 11 at 10B′*a* and to plate 18′ at 10B′*h*, the plate being held around the extension of shaft portion 6B*b* and flange 18*a*′ by packing 13A′ gripped by clamp 14′. Threaded extensions 11*a* and 12*a* may be threadedly joined together to complete the housing of the latch, as appears. Threaded extension 11*a* by means of its external threads may be used to anchor the latch assembly by engaging with other threads not shown. The interior of this housing may be filled with a lubricant. As the latch shaft moves in either direction one bellows will stretch while the other compresses, thus to hold the lubricant confined without the use of packing glands 17 and 17′ as in Fig. 33.

It is to be understood that all references in the specification and claims to "upper" and "lower," "upward" and "downward," etc., apply to the device as illustrated in the drawings wherein the upper portion of the device is shown uppermost.

The foregoing specification, drawings, and appended claims are intended to set forth the invention as fully as may be done within the limits of a patent, with the understanding that many minor changes can be made in construction and arrangement of parts within the scope and purpose thereof.

What is claimed is:

1. A latch mechanism for controlling reciprocatory movement comprising in combination, a pair of concentric members, an annular ridge on one of said members, radially movable latch members on the other of the members, means resiliently urging the latch members radially into engagement with said annular ridge, said last mentioned means comprising opposed latch ball roof and latch ball floor members having at least one diverging recess therebetween in which at least one of the latch members is movable, and a spring urging one of the opposed members toward the other.

2. A latch mechanism for controlling reciprocatory movement comprising in combination a reciprocatory member, a fixed member surrounding said reciprocatory member, an annular ridge on one of said members, radially movable latch members on the other of said members, means resiliently urging the latch members radially into engagement with the ridge bearing member, said last mentioned means comprising opposed latch ball roof and latch ball floor members having at least one diverging recess therebetween in which at least one of the latch members is movable, and a spring urging one of the opposed members toward the other.

3. A latch mechanism for controlling reciprocatory movement comprising a latch shaft having an annular ridge, an annular cage surrounding said shaft, radial ports in said cage, a latch member in each of said ports, a rider movable axially of the cage and shaft, said rider having prongs entering said ports and adapted to move the latch members inwardly into engagement with the latch shaft, and means resiliently urging the rider into engagement with the latch members.

4. A latch mechanism for controlling reciprocatory movement comprising, a latch shaft, an annular ridge thereon, a cage surrounding the latch shaft and having an opening through which the shaft and ridge are adapted to move, radial ball ports in said cage, there being radial slots longitudinally of the cage entering said slots, a latch ball in each of said ports, a rider surrounding the latch shaft and movable longitudinally thereof, said rider having outwardly tapering prongs adapted to enter the slots engage said balls, and a spring surrounding the latch shaft and pressing against said rider to resiliently urge the latch balls into engagement with the latch shaft.

5. A latch mechanism for controlling reciprocatory movement comprising, a latch shaft having an annular ridge thereon, a cage surrounding said shaft, latch members in radial ports in said cage, means movable longitudinally of said shaft and cage and having prongs entering said ports and engaging the latch members, and means for applying a resilient force to said last mentioned means to hold the latch members into resilient engagement with the latch shaft.

6. A latch mechanism for controlling reciprocatory movement comprising, a latch shaft having an annular ridge thereon, a cage surrounding said shaft, latch rollers in radial ports in said cage, a rider movable axially of said cage, said rider having outwardly tapering prongs entering said ports and in engagement with the rollers, and a spring in engagement with said rider applying a resilient force to hold the rollers in engagement with the latch shaft.

7. A latch mechanism for controlling reciprocatory movement comprising a latch shaft having an annular ridge thereon, a cage surrounding said shaft, latch rollers in radial ports in said cage, said rollers having rounded ends in engagement with the inner surfaces of the ports, and means for urging the rollers resiliently inwardly into engagement with the latch shaft.

8. A latch mechanism for reciprocable members comprising a latch shaft having a reduced section, a sleeve surrounding said reduced section and having limited axial movement thereon, a cage surrounding said latch shaft and sleeve, latching members within said cage and movable radially thereof, and means for resiliently urging said latching members into engagement with said sleeve.

9. A latch mechanism for controlling reciprocatory movement comprising a cage having radial ports with sidewardly undercut portions, there being a central opening in the cage, a reciprocable member within said opening, latching members within said ports, said latching members having bearing areas engageable within said undercut portions and an intermediate area engageable with said reciprocable member, and means for resiliently urging said latching members into engagement with recesses in the reciprocable member.

10. A latch mechanism for controlling reciprocatory movement comprising a fixed member having an inwardly projecting annular ridge, a reciprocating member passing through the fixed member, a ball floor and a ball roof on said reciprocating member, said floor and roof having confronting, spaced, outwardly diverging surfaces, latch balls between said surfaces, and means resiliently urging said floor toward said roof so that said balls will be held resiliently in engagement with the surrounding fixed member.

11. A latch mechanism for controlling reciprocatory movement comprising a fixed member having an opening, a reciprocating member passing through said opening, a latch floor and a latch roof on said reciprocating member, said floor and roof having spaced outwardly diverging surfaces therebetween, latch members interposed between said surfaces, and spring means urging said floor and roof toward one another to press said latch members against the inner surface of the fixed member.

12. A latch mechanism for controlling reciprocatory movement comprising a fixed cylindrical member having openings at the opposite ends thereof, a reciprocating member sealably passing through said openings, an annular ring fixed within the cylindrical member, a ball floor and a ball roof on the reciprocating member and adapted to pass through said ring, said floor and roof having outwardly diverging surfaces therebetween, latch members interposed between said surfaces, and spring means urging said floor and roof toward one another to press the latch members outwardly therefrom, there being longitudinal passages through said ring to allow passage of a lubricant during movement of the reciprocating member.

13. A latch mechanism for controlling reciprocatory movements comprising a cylindrical assembly having end connections at opposite ends of said assembly, each of said end connections having an opening axial with said assembly, a reciprocating member sealably received through said openings, said assembly consisting of a fixed ring central thereof and a bellows connected between said ring and one of said end connections and another bellows connected between said ring and the other of said end connections, one of said bellows contracting and the other expanding during each movement of said reciprocatory member, there being longitudinal passages through said ring to allow passage of a lubricant therethrough during each movement of said reciprocatory member, a ball floor and a ball roof on said reciprocatory member, said floor and roof being adapted to pass through said ring, and having outwardly diverging surfaces therebetween, latch members interposed between said surfaces, and spring means urging said floor toward said roof to press said latch members outwardly therefrom to engage an annular internal protrusion of said ring.

14. A latch device for yieldably holding a longitudinally movable stem in either one of two limit positions, said latch device comprising, a ball floor member secured on said stem a ball roof member mounted on said stem to slide toward or from said floor member, spring means adapted to press said roof member toward said floor member at all positions of said stem, a latch member, means for holding said latch member in a fixed position adjacent said stem and ball-holding members, and one or more balls adapted to be forced by said floor and roof members against said latch member and to engage one of the ends of the latter for either of said stem positions.

15. A latch assembly comprising, a ball floor having an inclined surface adapted to urge latch balls outward and a cupped surface adapted to limit the outward movement of said balls, a ball roof having an inclined surface adapted to urge latch balls outward and a cupped surface adapted to limit the outward movement of said balls, latch balls between said inclined surfaces, a shaft supporting said ball floor, a spring urging said roof to impinge said balls upon said floor, a latch housing nipple embracing said assembly, a latch sleeve secured within said nipple, said sleeve having longitudinal circulation openings and rounded ends, and means for reciprocating said shaft so as to cause said balls to move partially over said rounded ends as said shaft is reciprocated.

16. A latch assembly comprising, a ball floor having an inclined surface adapted to urge latch balls outward and a cupped surface adapted to limit the outward movement of said balls, a ball roof having an inclined surface adapted to urge latch balls outward and a cupped surface adapted to limit the outward movement of said balls, latch balls between said inclined surfaces, a shaft supporting said ball floor, a spring urging said roof to impinge said balls upon said floor, a latch sleeve around and secured immovably relative to said floor and roof, said sleeve having rounded ends, and means for reciprocating said shaft so as to cause said balls to engage alternately upon said rounded ends.

17. In a latch assembly, a ball floor having an inclined surface, a ball roof having an inclined surface, said surfaces confronting and diverging outwardly, latch balls between said floor and roof and engaging said inclined surfaces, a spring urging said roof upon said balls, means independent of said floor and roof for limiting the outward movement of said balls, and means included in said limiting means providing for the outward movement of said balls under the influence of said inclined surfaces and spring, thereby providing the latching action of said assembly.

18. In a latch of the character described, an assembly comprising, a conical floor member having an upraised peripheral lip, a conical roof member having a downwardly extending lip, balls between said floor and roof members and retained in assembled relation by said lips, and means for yieldably urging said floor and roof members toward each other.

19. In a latch of the character described, an assembly comprising, a pair of spaced complemental conical members, each having an inwardly extending peripheral lip, balls between said members, and yieldable means for urging said members toward each other, the balls being confined therebetween by said lips.

20. In a latch assembly, a latch housing nipple, and a latch sleeve therein, said sleeve having rounded ends providing delaying means for said latch, and longitudinal circulation openings to provide circulation for a lubricant to free the action of said latch.

ALEXANDER BOYNTON.